United States Patent [19]

Maendel

[11] Patent Number: 4,579,163

[45] Date of Patent: Apr. 1, 1986

[54] HEAT EXCHANGER CORE AND AIR FLOW CONTROL

[76] Inventor: Jonathan P. Maendel, Box 490, MacGregor, Manitoba, Canada, R0H 0R0

[21] Appl. No.: 610,473

[22] Filed: May 15, 1984

Related U.S. Application Data

[63] Continuation-in-part of Ser. No. 483,904, Apr. 11, 1983, Pat. No. 4,512,393.

[30] Foreign Application Priority Data

Mar. 29, 1983 [CA] Canada ................................. 424776

[51] Int. Cl.⁴ ............................ F24H 3/02; F28F 3/00
[52] U.S. Cl. ...................................... 165/54; 165/145; 165/160; 165/166
[58] Field of Search .................. 165/54, 159, 160, 144, 165/145, 166, 134 DP, DIG. 28

[56] References Cited

U.S. PATENT DOCUMENTS

| | | | |
|---|---|---|---|
| 1,083,395 | 1/1914 | Freeman | 165/145 |
| 1,662,143 | 3/1928 | Braun | 165/159 |
| 2,105,882 | 1/1938 | Fleisher | 165/145 |
| 2,825,210 | 3/1958 | Carr | 165/166 |
| 2,828,947 | 4/1958 | Hedbom | 165/166 |
| 2,854,220 | 9/1958 | Vaughan | 165/159 |
| 2,869,833 | 1/1959 | Aronson et al. | 165/145 |
| 4,049,051 | 9/1977 | Parker | 165/166 |
| 4,342,359 | 8/1982 | Baker | 165/134 DP |

FOREIGN PATENT DOCUMENTS

| | | | |
|---|---|---|---|
| 719256 | 2/1932 | France | 165/159 |
| 197805 | 5/1978 | Netherlands | 165/DIG. 12 |
| 872936 | 10/1980 | U.S.S.R. | 165/145 |

Primary Examiner—William R. Cline
Assistant Examiner—John K. Ford
Attorney, Agent, or Firm—Ade & Company

[57] ABSTRACT

A heat exchange apparatus includes a core mounted within a casing and two fans arranged to draw air from the exterior of a building through the core in a first path and to draw air from the interior of the building through the core in a second path. The core is made up from a plurality of tubular cells each formed from a single folded sheet of aluminum and having a slot shaped cross section. The short sides of the slot are arranged to face the inlet of cold exterior air so that it impinges upon the outer surface of the short side. The fan drawing the warm air is arranged to direct air onto the other surface of the short side so that the short side and the surrounding portions of the long sides act as an effective heat exchange surface free from the seam of the tubular core which is arranged adjacent opposite the short side. A differentially perforated baffle plate spreads the cold air over core such that more cold air is directed to the warm end of the core. The amount of warm air passing through the core is arranged to be greater than the amount of cold air so as to maintain the core above frosting temperatures. The excess of air can be arranged by bypassing air to and from the interior of the building through openings in the casing.

12 Claims, 6 Drawing Figures

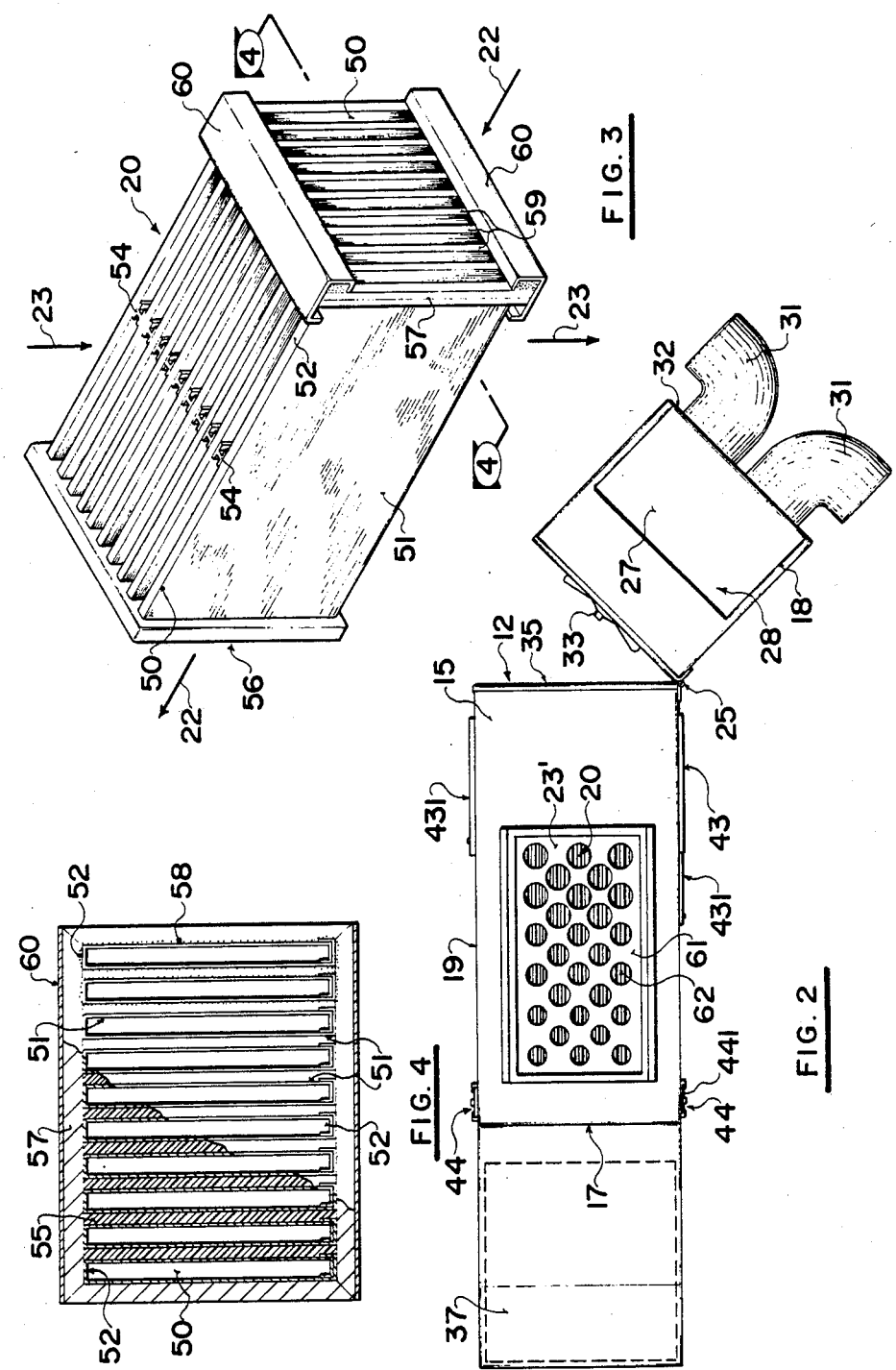

HEAT EXCHANGER CORE AND AIR FLOW CONTROL

BACKGROUND OF THE INVENTION

This application is a continuation-in-part of application Ser. No. 483,904 filed Apr. 11, 1983, now U.S. Pat. No. 4,512,393.

This invention relates to new and useful improvements in air to air heat exchangers for use in exchanging air between the exterior and interior of a building.

Normal heat exchangers used for this purpose merely exhaust inside air through a core and draw cold outside air through opposing channels so that heat is picked up by the outside air from the exhausting air prior to the exhausting air being discharged. Due to the higher relative humidity of the exhausting warm air, a considerable amount of moisture is carried thereby and the heat exchanging core often drops the temperature of this air below the dew point thus causing the water or moisture to condense and with cold outside air passing through the heat exchanger, severe frosting often occurs. This frosting is so severe that the heat exchanger becomes inoperative unless defrosting takes place.

Conventional heat exchangers defrost by reversing the flow of air by routing the inside air through the incoming air channels. Inasmuch as this inside air is often contaminated, the channels normally carrying the fresh outside air also becomes contaminated. Furthermore, particle deposition can take place with the subsequent reduction of cross-sectional area of channels normally carrying the clean air inwardly.

Various methods for defrosting have been proposed but all these methods add complication and efficiency. Attempts have been made to manufacture a heat exchange apparatus of this type which is substantially free from frosting problems but todate have not met with success.

SUMMARY OF THE INVENTION

It is accordingly one object of this invention to provide a heat exchange apparatus which overcomes these disadvantages and substantially operates without the problem of frosting thus avoiding the complications necessary for regular defrosting procedures.

The invention provides a heat exchange apparatus for exchanging air between the exterior and interior of a building comprising an enclosure, a heat exchange core mounted within the enclosure, means associated with the core dividing said enclosure into a first path for conveying outside air into the building and a second path for conveying inside air to the outside of the building, said second path passing through the core from an inlet end at which the air is warmest to an outlet end at which the air is coldest in heat exchanging and air impervious relationship with said first path, and a perforated baffle arranged in the first path adjacent to and upstream of the core to control the spread across the core of outside air entering the core and differentially perforated so as to provide a greater area of perforation adjacent said inlet end of the core than at said outlet end.

The baffle therefore controls the spread of the cold air over the core so that more cold air is directed to the warmer parts of the core. In this way, the core is used to its maximum extent while preventing specific areas of the core freezing since immediately freezing commences, it soon spreads through the core since the freezing inhibits movement of the warm air through certain areas thus allowing the core to yet further cool.

The baffle is arranged so that the whole of the cold air is applied to the surface of the core but is spread over that surface.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 2 is a top plan view of the heat exchanger with the air control valve door in the open position.

FIG. 3 is an isometric view of the core per se.

FIG. 4 is a cross sectional view along the lines 4—4 of FIG. 3 showing the internal construction of the core.

In the drawings like characters of reference indicate corresponding parts in the different figures.

DETAILED DESCRIPTION

Figure 1:
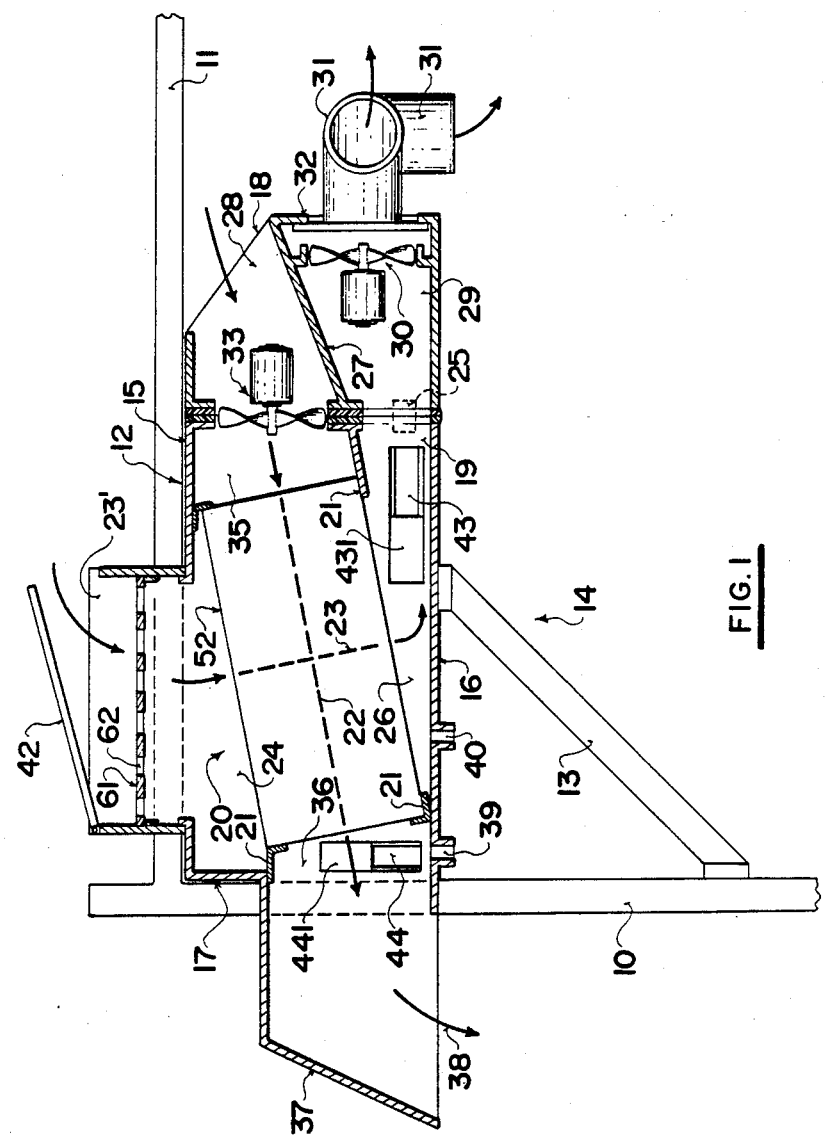
FIG. 1 is a partially schematic side elevation sectioned in part showing the heat exchanger installed through the wall of a building.

Proceeding therefore to describe the invention in detail, reference should first be made to FIG. 1 in which 10 illustrates an outside wall of a building and 11, the ceiling of the barn or building. The heat exchanger assembly collectively designated 12 is preferably situated adjacent the junction of the wall and ceiling and may be supported by means of struts 13 in a conventional manner with the major portion of the heat exchanger being situated internally of the building in the area designated by reference character 14.

The heat exchanger includes a casing having an upper side 15, a lower spaced and parallel side 16, a rear wall portion 17, a front wall portion 18 and spaced and parallel side walls 19.

A conventional heat exchanging core collectively designated 20 is supported within the enclosure by means of brackets or plates 21 at an inclined angle as shown in FIG. 1, FIGS. 3 and 4 show details of the core. The core 20, together with the supporting plates 21 divide the enclosure and the core into an outside air intake conveying system and an inside air outlet conveying system as will hereinafter be described.

The core, includes a plurality of channels extending longitudinally therethrough in the direction of arrow 22 and a plurality of further channels extending from the upper side to the lower side of the core at right angles to the first channels and indicated by reference character 23 and it should be noted that the two sets of channels constitute pathways for the movement of air at right angles to one another and in heat exchanging relationship but that the two pathways are air impervious to one another so that no actual mixing of the air occurs.

The pathway defined by the channels in the direction of arrow 23 constitutes a first path through the core and the pathway through the other channels in the direction of arrow 22 constitutes a second path through the core.

An outside air intake 23' is situated in the upper side 15 of the enclosure and communicates with an area 24 defined by the upper side of the core, the support plate 21 and part of the upper wall 15 and this area communicates directly with the upper side of the first path 23 but is completely isolated from the second path 22 of the core.

The lower side of the core extends between the lower wall 16 and a further support plate 21. Together with the base of the core, the base 16 and the further plate 21 define an area 26 which is also completely sealed off from the second path 22. The areas 24 and 26 and the first path 23 through the core constitute the aforementioned outside air intake conveying system.

The front wall 18 of the casing is preferably hinged vertically on one side as at 25 so that it may be swung open for cleaning and maintenance as shown in FIG. 2. This front portion includes an inclined divider 27 thus dividing the front portion into an air discharge section 28 and an air intake section 29 and the area 26 below the core communicates with this air intake section 29 and constitutes part of the outside air intake conveying system hereinbefore mentioned. A fan assembly 30 is mounted within the section 29 and adjustable air discharge spouts 31 extend from the front wall 32 of this section as clearly shown in FIGS. 1 and 2.

The area 28 of the front section 18 includes a further fan assembly 33 drawing air through the open front end 34 of the section 28 and discharging same into an area 35 in the front of the casing above the support plate 21 and the upper wall 15 and through the path 22 of the core 20. It passes through the core and into a rear area 36 below the upper and lower plates 21 and the wall 10 whereupon it passes through a discharge hood 37 situated exteriorly of the building on the outer surface of the wall 10 and discharges downwardly to the outside air in the direction of arrow 38.

Outside air at ambient temperature is drawn in through the intake 23', through the core along the first path 23 and is discharged via ducts 31 to the interior of the building, the movement of air being controlled by fan 30.

At the same time, fan 33 draws warm moist air from the building through the second path of the core 20 and discharges same exteriorly of the building through the hood 37.

An opening 43 is provided in the casing communicating with the section 26.

The opening 43 is covered by a readily adjustable door 431 (shown in partly open position) so that the area of opening communicating the area 26 to the interior of the building can be varied depending upon requirements. In this way the amount of air drawn through the heat exchange core 20 by the fan 30 can be reduced and replaced by air re-circulated from the interior of the building.

In addition a further similar opening 44 is provided in the area 36 communicating the area 36 selectively to the interior of the building. Similarly, the opening 44 can be selectively covered by a door 441. The opening 44 allows an adjustable proportion of the air passing through the core 20 from the interior of the building to be re-circulated back into the interior of the building rather than exit through the nozzle 37. Such re-circulated air is cooled by the block 20 and hence a proportion of the moisture contained in the air will have been condensed out and deposited in the core for ejection through a nozzle 39.

Turning now to the details of the heat exchange core 20, this is shown in detail in FIGS. 3 and 4 and comprises a plurality of separate cells 50, each formed from a single aluminum sheet folded to form a tubular conduit of slot shaped cross-section defined by two long sides 51 and two short sides 52. The seam or overlapping section in the folded sheet is arranged at the bottom of the cell remote from the air inlet 23'. The length of the cell 50 from one end to the other end defines the length of the block 20 in regard to the path 22 and the width of the sides 51 transverse to the path 22 defined the length of the core 20 relative to the path 23.

The number of cells contained in the block can vary in accordance with the air flow required. Each cell 50 is separated from the next cell by three spacers 53 and 54 (FIG. 3) and 55 (FIG. 4). The spacers 53 and 54 are secured in position by a resilient set material which bonds the spacer into position and provides air sealing around the ends of the tubular cells 50. A casing 56, 57 is wrapped around the outside of the core at respective ends so as to clamp the cells together to form the core. The resilient set material is indicated at 58 in FIG. 4.

The end of the core 20 adjacent the fan 33 onto which air in the path 22 is directed is provided with sheet metal covers 59 and 60. The covers 59 comprise U-shaped members extending over the spacers 55 so that each cover 59 extends from the interior of one tubular cell 50 to the interior of the next adjacent cell 50 in close contact with the adjacent walls of the two cells so as to bridge the gap and direct air smoothly into one or other of the cells. Two covers 60 are provided across the top and the bottom of the core adjacent the fan 33 to provide smooth clean lines covering the casing 57 and resilient material 58 and directing air properly into the cells 50. The covers 59 and 60 act to prevent the accumulation of dirt and other debris carried from the interior of the building by the fan 33.

It will be noted that the sides 52 of the tubular cells 50 remote from the seam are presented forwardly toward the flow of air in the path 23 from the inlet 23'. That is, the cold air coming from the exterior of the building first encounters the transverse surfaces provided by the sides 52 and impinges thereon. In addition, the warm air from the interior of the building forwarded by the fan 33 is directed into the core along the tubular cells 50 at an angle thereto so as to impinge upon the other face of the sides 52. It will be noted from FIG. 1 particularly that the fan blades of the fan 33 are substantially vertical whereas the upper surfaces 52 lies at an angle to the horizontal so that the air transported in a substantially horizontal direction by the fan 33 impinges upon the surfaces 52 at an angle thereto. Thus, the face of the surfaces 52 remote from the cold inlet air is swept by the warm interior air continually so as to maintain the surface 52 at a sufficient temperature to avoid frosting. This applies also to the upper portions of the surfaces 51 which are also free from the seam and hence effective heat exchangers. It will also be noted that only a single sheet of metal separates the incoming cold air from the outgoing warm air and thus heat exchange is effective and rapid in view of the high thermal conductivity of the metal.

Furthermore, in order to ensure that frosting does not occur during normally expected temperature ranges, the apparatus can be organized so that a greater volume of air is passed through the core 20 along the path 22 than along the path 23. For this purpose it will be noted that the area of the tubular cells is greater than the area between the cells thus providing a greater total area for the path 22 than for the path 23. In addition, the fan 33 is preferably of a greater fan blade diameter than the fan 30 so that it acts to propel a larger volume of air. Furthermore, the volume of air passing through the core along the paths 22 and 23 can be modified by opening and closing the openings 43 and 44. Finally, the amount of air drawn along the path 23 by the fan 30 can be reduced by partially closing a door 42 to vary the inlet opening 23'. In practice, it is preferred that the volume of air passing along the path 22 is of the order of twice the volume of air passing along the path 23.

In order to prevent excess air being drawn out of the building thus reducing the static pressure within the building to a level where the fan 33 is unable to drawn the full volume of air, the openings 43 and 44 can be adjusted. Specifically, uncovering the opening 43 acts to reduce the amount of air drawn through the core 23 by the fan 30. Uncovering the opening 44 acts to return some of the air passing along the path 22 back to the interior of the room. In this way the heat exchanger itself can be adjusted to control the volume of air passing along the paths 22 and 23 such that the former is of the order of twice the latter while drawing the same amount of air through the inlet 23' as it is ejected through the nozzle 37. Of course, a compensation for the temperature difference must be taken into account in any calculations since this will affect the instantaneous volume of any particular quantity of air.

Alternatively, the heat exchanger may be adjusted to pump a greater volume of air from the interior the building than it drawns into the building with the balancing amount of air being drawn into the building from other ventilation sources without any attempt to heat the air as it is drawn in.

Referring again to FIG. 2, immediately upstream of the core 20 in the path of the outside air entering from the inlet 23' is provided a baffle plate 61 including a plurality of holes 62 through which the air passes in its movement to the front face of the core 20. The holes at the right-hand end of the baffle plate 61 are of a larger diameter than those at the left-hand end such that the holes are gradated from 1.5 inch diameter down to 1.0 inch diameter in three or more zones. This increased proportion of hole area per unit area at the right-hand end of the core ensures that the air is distributed across the face of the core with more of the cold air going to the warmer end of the core adjacent the warm air inlet than goes to the colder end of the core adjacent the warm air outlet. The ratio of the total hole area to the total area of the plate is of the order of 1:4 and this has been found to provide suitable distribution of the air across the core face.

It will be appreciated that the distribution of air provided by the baffle 61 assists in the avoidance of icing since less air is directed to the cold end of the core where icing is most likely to occur. The hole sizes stated are only one example and in practice the variation in hole size is calculated in accordance with measured temperature drop across the heat exchange core from the warm air inlet to the warm air outlet. In an alternative arrangement (not shown) the increased proportion of perforation at the right-hand end can be provided by increasing the number of holes rather than increasing the diameter of the holes.

Figure 5:
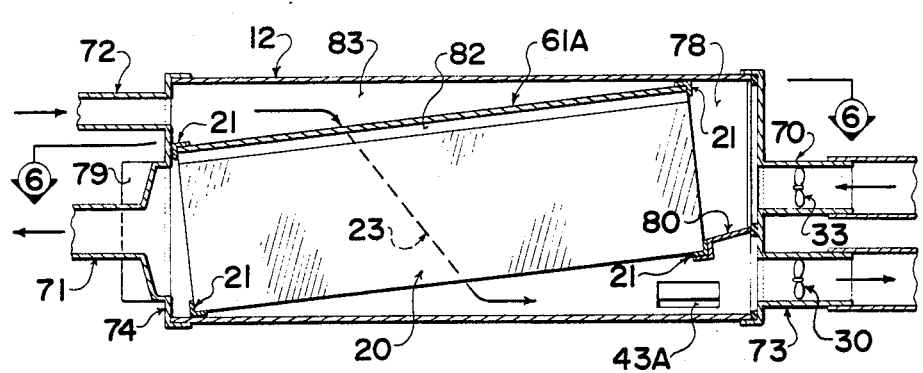
FIG. 5 is a partially schematic side elevational view similar to FIG. 1 showing a modified heat exchanger, the cross section taken, being shown, along the lines 5—5 of FIG. 6.
Figure 6:
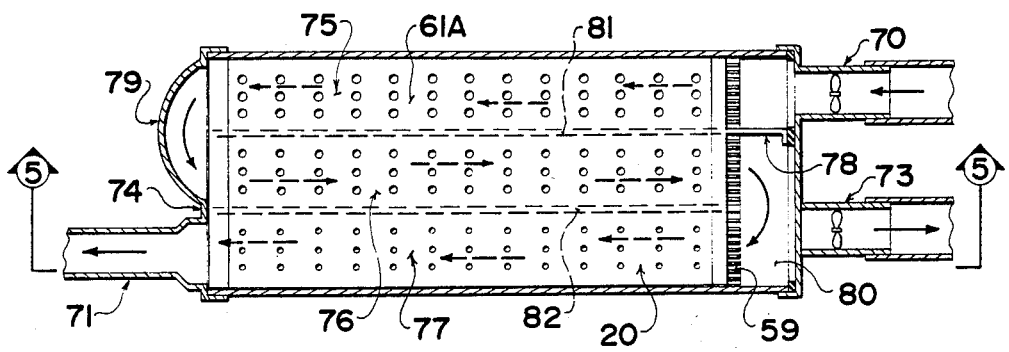
FIG. 6 is a cross sectional view along the lines 6—6 of FIG. 5.

FIGS. 5 and 6 show a modified arrangement of a heat exchanger which is particularly useful for acting as an air to air heat exchanger from a home or other building which does not involve the ejection of polluted or contaminated air.

The structure of the heat exchanger is substantially the same as that shown in FIGS. 1 through 4 apart from the following modifications. The inside air inlet 70, the inside air outlet 71, the outside air inlet 72 and the outside air outlet 73 are all modified to receive ducting so that the heat exchanger generally indicated at 12 can be mounted inside the building with connections to duct work communicating to suitable locations within the building and communicating to an inlet and outlet outside the building. For this purpose, the outside air inlet 72 is positioned on a rear surface 74 of the heat exchanger rather than in the upper surface as shown in FIG. 1.

The most important difference is that the housing includes devices which separate the second path through the core, that is the warm air path into three separate portions indicated at 75, 76 and 77. This is achieved initially by a divider plate 78 which separates the portions 75 and 76 so that the warm air inlet 70 from the fan 33 communicates the warm air to one side of the divider 78 so they can only enter the portion 75. At the end of the portion 75, that is at the end of the core remote from the inlet 70, a part cylindrical plate 79 is mounted the length of which is co-extensive with the height of the core and the radius of which is suitable to turn the air exiting from the first portion 75 into the second portion 76 for movement back through the core in the opposite direction to the first portion.

At the front end of the core, the air exiting from the second portion 76 enters a chamber defined by the top wall of the enclosure, by the divider 78 and by a bottom support surface 80 so that it returns in a direction parallel to the portion 75 along the third portion 77 to the outlet 71.

The outlet 71 is confined to one third of the end wall 74 and lies alongside the cylindrical deflector plate 79.

Air entering from outside the building through the cold air inlet 72 enters the chamber defined above the core by the enclosure and encounters a baffle plate 61A having the same function as the baffle plate 61 in FIG. 1. In this case, however, the baffle plate 61A is attached to the core and is closely spaced from the upper surface of the core and lies parallel thereto. The spacing in one example of the order of 1 inch and the baffle plate is supported relative to the core by divider plates 81, 82 are located at the transverse extent of the core necessary to divide the portions 75, 76 and 77 one from the other. Thus, the cold air in the chamber indicated at 83 above the baffle plate 61A enters one or other of the portions 75, 76 and 77. The whole of the upper face of the core is however, available for the cold air to enter.

As mentioned in relation to the baffle 61 of FIG. 1, the baffle 61A is also differentially perforated. In the example shown, the area above the portion 75 has the largest holes and also the largest number of holes so that more air from the chamber 83 enters the core at the portion 75 than at the portion 76 or the portion 77. The number of holes as shown is constant along the length of the portion 75 but it is possible also to gradate the hole size from the inlet end of the portion 75 to the outlet end thereof. In a similar manner the holes in the baffle above the portion 76 are of larger diameter than those above the portion 77 so that the volumes of air entering the portions 75, 76 and 77 are gradated. The number of holes can be calculated in accordance with measured temperatures in the respective portions and if required a full gradation throughout the whole of the warm air path of the holes can be calculated by computer in accordance with inlet and outlet temperatures of the warm air path.

The fan 33 has a considerably larger capacity than the fan 30 in view of the greater restriction to air flow provided by the long path of the portion 75, 76 and 77. The length of the warm air path is in view of these portions increased relative to the cold air path so that it is at least three times greater than the cold air path. This increase in length causes a considerable increase in velocity of the air as it passes through this path and this velocity increase assists in sweeping the heat exchange surfaces of the core and in mixing the air to provide the best heat transfer to the surfaces.

In contrast the cold air path comprises a single path through the core of shorter lengths and the whole of the inlet cold air is exposed to the whole of the upper surface of the core. This arrangement is provided in order to reduce or avoid freezing of the core since freezing will occur if a large amount of cold air is ducted through a small portion of the core. In such a circumstance the large amount of cold air will overcome the heat supplied to that area of the core by the warm air and will commence freezing of the moisture in the warm air thus blocking part of the core. Once part of the core is frozen in this way the remainder will quickly follow.

A door 43A is provided in the cold air path downstream of the core to allow the entry and mixing into that path of air from inside the building. It will of course be appreciated that when the paths of air are designated warm and cold it is intended to refer to the operator of the device during cold weather. However, the device can of course be used in warm weather when the interior of the house or building is colder than the outside. In this case the door 43A can be used to introduce cold basement air into the air entering the building for circulation around the building. The door 43A instead of being of the slide type shown in FIG. 1 is of the awning type.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. Heat exchange apparatus for exchanging air between the exterior and interior of a building comprising an enclosure, a heat exchange core mounted within the enclosure, means associated with the core dividing said enclosure into a first path for conveying outside air into the building and a second path for conveying air to the outside of the building, said second path arranged to transmit inside air through the core from an inlet at which the air is warmest to an outlet at which the air is coldest in heat exchanging and air impervious relationship with said first path, and said second path including a first portion adjacent said inlet extending through the core through which inside air passes in a first direction and a second portion alongside the first portion through which inside air passes from the first portion through the core in the opposite direction, and a perforated baffle arranged in the first path adjacent to the first and second portions and upstream of the core to control the spread across the core of outside air entering the core and differentially perforated so as to provide a greater area of perforation adjacent said first portion than adjacent said second portion.

2. Apparatus according to claim 1 wherein the baffle comprises a single baffle plate which is perforated by a plurality of individual holes passing therethrough.

3. Apparatus according to claim 2 wherein the holes are of different sizes to provide the differential perforation.

4. Apparatus according to claim 2 wherein the baffle plate is mounted within the enclosure.

5. Apparatus according to claim 2 wherein the baffle plate is substantially co-extensive with a face of the core through which the outside air enters the core and wherein the baffle plate is arranged closely adjacent but spaced from the face.

6. Apparatus according to claim 1 wherein the second path is longer than the first path.

7. Apparatus according to claim 1 wherein the second path is at least three times longer than the first path.

8. Apparatus according to claim 1 wherein the baffle includes two zones, each zone cooperating with a respective one of the portions and divider means extending between the core and the baffle so as to prevent air passing through one zone of the baffle, entering the core in the other of the portions.

9. Apparatus according to claim 1 wherein the second path is divided into three portions arranged side by side such that a first portion is arranged to transmit inside air through the core in a first direction, the second portion is arranged to transmit inside air through the core in the opposite direction and the third portion is arranged to transmit inside air through the core in the first direction, and means for reversing the direction of the inside air at each end of the core so as to traverse from one portion to the next.

10. Apparatus according to claim 9 wherein the baffle is divided into three zones and there is provided divider means extending between the core and the baffle so as to prevent air between the baffle and the core communicating from one zone to the next adjacent zone.

11. Apparatus according to claim 1 wherein the baffle comprises a single baffle plate which is perforated by a plurality of individual holes passing therethrough, the plate being co-extensive with a face of the core through which the outside air passes into the core, means mounting the baffle plate closely adjacent but spaced from the face of the core and divider means extending between the baffle plate and the core for preventing the passage of air transversely between the plate and the core form one area thereof to another area.

12. Apparatus according to claim 11 wherein the baffle plate is divided into a plurality of zones with the holes of each zone being differentially sized from the hole of the other zones, the divider means being arranged to divide each zone from the other zones.

* * * * *